US009454750B2

(12) United States Patent
Sinha et al.

(10) Patent No.: US 9,454,750 B2
(45) Date of Patent: Sep. 27, 2016

(54) TECHNIQUES FOR ESTIMATING DISTANCE BETWEEN MEMBERS OF A SOCIAL NETWORK SERVICE

(75) Inventors: Shakti Dhirendraji Sinha, Sunnyvale, CA (US); Xufei Wang, Tempe, AZ (US); Jiong Wang, San Ramon, CA (US)

(73) Assignee: LINKEDIN CORPORATION, Mountain View, CA (US)

( * ) Notice: Subject to any disclaimer, the term of this patent is extended or adjusted under 35 U.S.C. 154(b) by 250 days.

(21) Appl. No.: 13/552,392

(22) Filed: Jul. 18, 2012

(65) Prior Publication Data

US 2014/0025673 A1 Jan. 23, 2014

(51) Int. Cl.
*G06F 17/30* (2006.01)
*G06F 7/00* (2006.01)
*G06Q 10/10* (2012.01)
*G06Q 50/00* (2012.01)

(52) U.S. Cl.
CPC ............ *G06Q 10/101* (2013.01); *G06Q 50/01* (2013.01)

(58) Field of Classification Search
USPC .......................................................... 707/732
See application file for complete search history.

(56) References Cited

U.S. PATENT DOCUMENTS

| | | | |
|---|---|---|---|
| 8,015,119 B2 * | 9/2011 | Buyukkokten et al. ....... 705/319 |
| 8,667,009 B2 * | 3/2014 | Voigt et al. .................... 707/769 |
| 2009/0061902 A1 * | 3/2009 | Abhyanker ................ 455/456.3 |
| 2009/0319288 A1 * | 12/2009 | Slaney et al. ...................... 705/1 |
| 2010/0132049 A1 * | 5/2010 | Vernal et al. .................... 726/27 |
| 2010/0269158 A1 * | 10/2010 | Ehler et al. ......................... 726/4 |
| 2011/0119230 A1 * | 5/2011 | Zuber ............................ 707/608 |
| 2011/0289574 A1 * | 11/2011 | Hull et al. ......................... 726/7 |
| 2012/0150960 A1 * | 6/2012 | Nalawade ..................... 709/204 |
| 2012/0166255 A1 * | 6/2012 | Rizk ................................ 705/12 |
| 2013/0024453 A1 * | 1/2013 | Duke ............................. 707/737 |

* cited by examiner

*Primary Examiner* — Kuen Lu
(74) *Attorney, Agent, or Firm* — Schwegman Lundberg & Woessner, P.A.

(57) ABSTRACT

Techniques for estimating, in real time, the likelihood that any particular member of a social network service is a third degree connection of another member are described. Consistent with some embodiments, various member profile attributes of a member are used as a sort of proxy for determining the likelihood or probability that the member is a third degree connection of another member. For example, in some instances, the number of first-degree connections a member has is used to derive a probability score indicating the likelihood that the member is a third-degree connection of another member, such as a person performing a people-search. Once derived, the probability score for each member may be used in various applications, such as a people-search engine, to boost or increase a ranking score assigned to each search result and used to order the search results when presented to the user who has performed the search.

20 Claims, 5 Drawing Sheets

TECHNIQUES FOR ESTIMATING DISTANCE BETWEEN MEMBERS OF A SOCIAL NETWORK SERVICE

TECHNICAL FIELD

The present disclosure generally relates to data processing systems. More specifically, the present disclosure relates to methods, systems and computer program products for estimating, in real time, the likelihood that a first member of a social network service is a third-degree connection of another member.

BACKGROUND

Online social network services provide users with a mechanism for defining, and memorializing in a digital format, their relationships with other people and other entities (e.g., companies, schools, etc.). This digital representation of real-world relationships is frequently referred to as a social graph and is typically implemented with a specialized database referred to as a graph database. A graph database is a particular type of database that uses graph structures with nodes, edges, and properties to represent and store data. Accordingly, when two members of a social network service establish a "connection"—for example, by mutually acknowledging their relationship—nodes representing the two members will be connected via an edge indicating the existence of the particular relationship between the two members.

As shown in FIG. 1, the node representing the member with reference number 12 has three first-degree connections (e.g., members represented by nodes 14-A, 14-B and 14-C), sometimes referred to simply as friends or direct connections. Additionally, the member represented by the node with reference number 12 has nine second-degree connections (e.g., members represented by nodes 16-A through 164), or friends-of-friends. Based on this overly simplified example, it becomes abundantly apparent that the number of people at each level increases dramatically. In real world examples, it is not uncommon for a member to have thousands, or even tens of thousands, of third-degree connections. Because of the large number of third-degree connections, it is costly and inefficient from a computing resources perspective to have an index stored in memory for the purpose of quickly identifying those members of a social network service who are third-degree connections of a particular member. Consequently, for various applications that benefit from information identifying a member's third degree connections (e.g., such as a people-search engine), there exists a need for an efficient technique by which to identify members of a social network service who are, or who are likely to be, third-degree connections of a particular member.

DESCRIPTION OF THE DRAWINGS

Some embodiments are illustrated by way of example and not limitation in the FIG.s of the accompanying drawings, in which.

DETAILED DESCRIPTION

Figure 1:
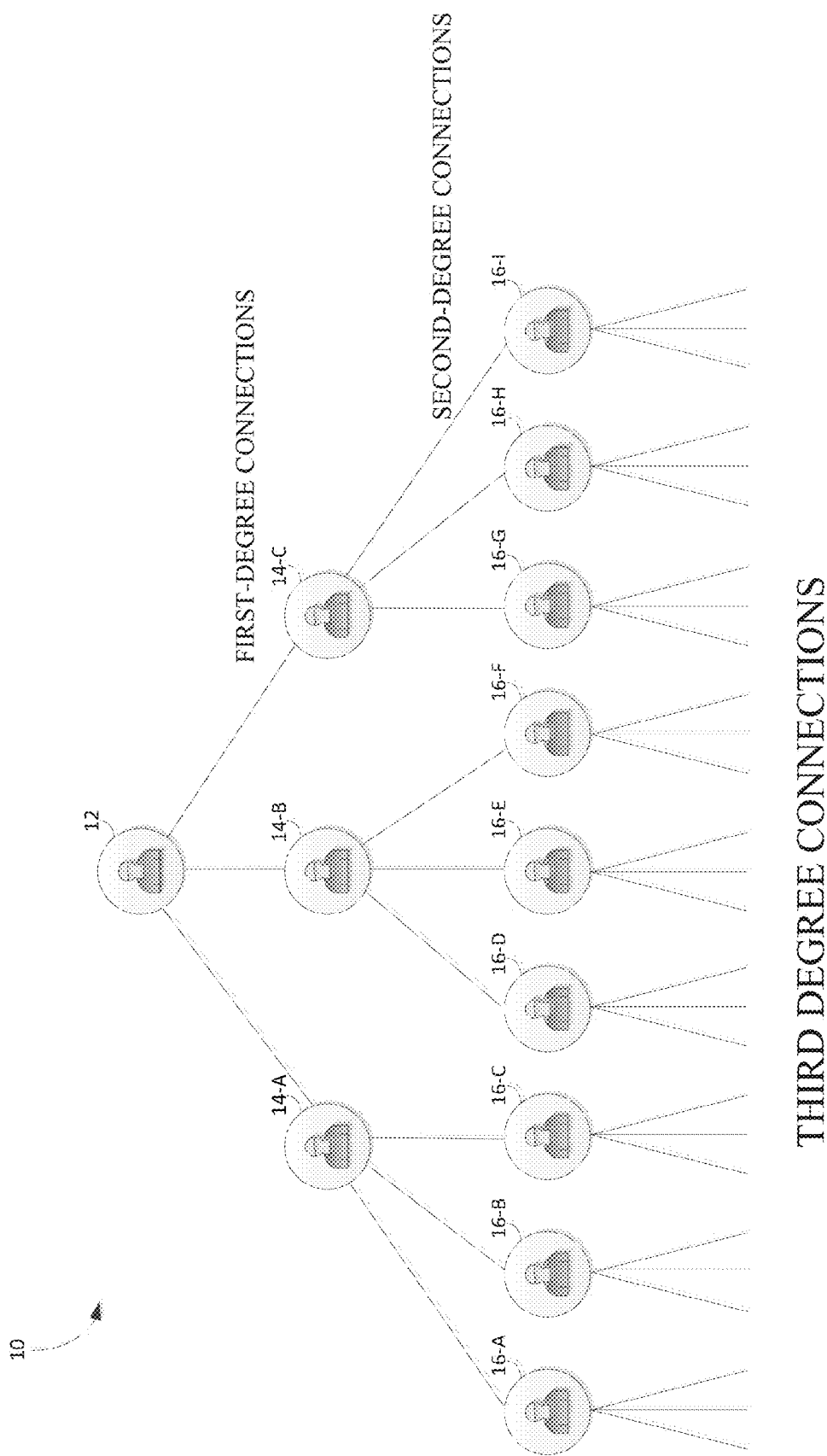
FIG. 1 is a block diagram illustrating a simple example of a portion of a social graph showing the first, second and third-degree connections of a particular member, consistent with some embodiments of the invention.

The present disclosure describes methods, systems and computer program products for estimating, in real time, the likelihood that any particular member of a social network service is a third-degree connection of another member. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

Because members of a social network service generally have a large number of third-degree connections, identifying a member's third-degree connections efficiently in real-time, with minimal delay, is non-trivial. Accordingly, embodiments of the present invention involve a technique for estimating the likelihood that a particular member is a third-degree connection of another member, based primarily upon an analysis of certain attributes in a member's profile. For example, for a particular social graph maintained by a social network service, a study may be undertaken to identify the various member profile attributes that are the best indicators of the likelihood that a particular member will be a third-degree connection of another member. In some instances, a particular attribute will by itself be a good indicator. For instance, with some embodiments, the number of direct (i.e., first-degree) connections (or friends) that a particular member has may be a good indicator for the likelihood that the member will be a third-degree connection of another member. In other instances, a comparison of member profile attributes is performed. For instance, if two members share in common certain attributes (e.g., geographic location, email domain address, job titles, industry in which employed, etc.), the commonality in the attributes may be used as an indicator of likelihood that the two members are third-degree connections.

With some embodiments, the particular attribute or attributes that are used to estimate the distance between the members of the social network service are normalized to generate a probability score that represents a measure of likeliness that a particular member is a third-degree connection of another member. Accordingly, at least with some embodiments, the closer a probability score assigned to a particular member is to the number one, the more likely the member is a third-degree connection of another member. Similarly, at least with some embodiments, the closer the probability score is to the number zero, the more likely that the particular member is not a third-degree connection of another member. Accordingly, the probability score can be generated in real-time and used as an estimate or measure of likeliness that two members are third-degree connections. The probability scores can be used by any number of applications that require social graph information, and in particular, a people-search engine.

A wide variety of applications leverage the social graph maintained by a social network service. One application in particular is a people-search engine. As its name suggests, a people-search engine is a search engine that facilitates searching for people. Generally, a people-search engine operates by enabling a user (e.g., a searcher) to establish a search query by entering, selecting, or otherwise specifying various attributes or characteristics of a person, and then processing the search query against member profile information and ultimately presenting a list of search results, with each individual result providing the name and perhaps some additional information about a person having a member profile matching the search query in some way. To ensure that the most relevant search results are presented in the most prominent positions of the search results list (e.g., typically at the top of the list), the individual results may be assigned a ranking score or otherwise ranked or weighted based on various relevance criteria, and then ordered based on each result's corresponding ranking score. In some embodiments, the ranking score is, or is at least based on, a probability score as described above.

Consistent with some embodiments of the invention, information obtained via analyzing the social graph can be used to derive the weighting factors used in ranking the search results in order to position the most relevant results first. In particular, the relationship that the searcher has to each member representing a search result may be used to derive weighting factors that affect the position of the search results in the search results page. For instance, if a member is a first-degree connection (or direct connection, or friend) of the searcher, it make sense to boost or otherwise positively influence the ranking score assigned to the member so that his or her member profile appears more prominently in the list of search results. Of course, other factors other than the degree of connection between two members may also influence the overall ranking score that is used in ordering the search results. In any case, to ensure that a search is processed efficiently, various relationship information (particularly, first and/or second-degree connections) for members may be readily accessible via a database stored in memory. However, because the number of third-degree connections for any particular searcher is likely to be great, other techniques such as those described herein may be used to estimate the likelihood that a member is a third-degree connection of another member (e.g., the searcher). Although these techniques will find particular application in use with a people-search engine, any number of other applications that may benefit from information indicating or identifying third-degree connections of a member of a social network service may benefit from the inventive subject matter described herein.

Consistent with some embodiments, to approximate the distance between two members of the social network service, various member profile attributes may be analyzed. For example, with some embodiments, the number or count of direct connections (i.e., first-degree connections) that a particular member has may be used almost like a proxy to represent the likelihood that a member is a third-degree connection of another member. In some instances, the particular attribute or attributes that are used to derive the probability score representing the likelihood that a member is a third-degree connection are stand-alone or independent attributes, such as the number of connections that a particular member has. In other instances, the probability score may be based on the searcher and a particular member sharing in common a particular member attribute or attributes. For example, when both the searcher and the member are employed in the same industry, in some instances there is generally a greater likelihood that the two will be third-degree connections. Similarly, if the searcher and the member are both employed at the same company, and therefore share in common the same email domain (e.g., "@company.com"), there is likely a greater likelihood that the two are third-degree connections. As described in greater detail below, other profile attributes may also be used to derive the probability that two members are third-degree connections.

With some embodiments, the various member profile attributes that are used to estimate the distance between two members in general, and predict whether two members are third-degree connections in particular, are selected based on some analysis of the collective member profile data and social graph. In particular, various techniques including machine learning techniques may be used to identify the particular member profile attributes that are most effective for purposes of estimating the likelihood that any two members of a social network service are third-degree connections. Furthermore, with some embodiments, an algorithm or formula that takes into consideration multiple member profile attributes may be used to estimate the distance between two members in general, and establish a likelihood that two members are third-degree connections in particular. With some embodiments, different factors may be weighted more or less heavily in any particular calculation to derive the measure representing the probability that two members are third-degree connections. Other advantages of the inventive subject matter will become readily apparent based on the description of the various figures that follows.

Figure 2:
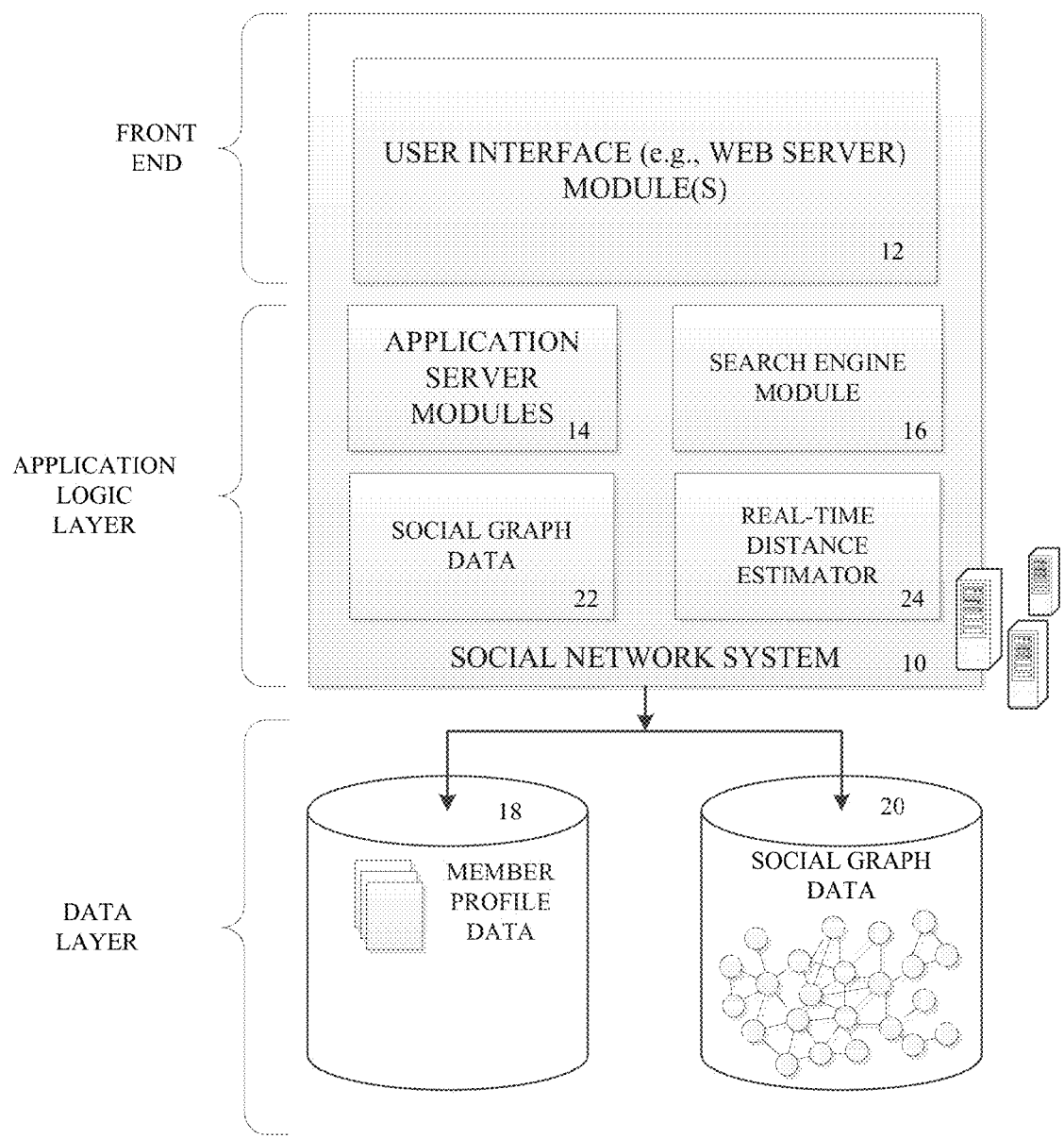
FIG. 2 is a block diagram of the functional modules or components that comprise a computer-network based social network service, according to some embodiments of the invention.

FIG. 2 is a block diagram of the functional modules or components that comprise a computer-network based social network service, according to some embodiments of the invention. As shown in FIG. 2, the social network system 10 is generally based on a three-tiered architecture, consisting of a front-end layer, application logic layer, and data layer. As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, a skilled artisan will readily recognize that various additional functional modules and engines may be used with a social network system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although depicted in FIG. 2 as a three-tiered architecture, the inventive subject matter is by no means limited to such architecture.

As shown in FIG. 2, the front end consists of a user interface module (e.g., a web server) 12, which receives requests from various client-computing devices, and communicates appropriate responses to the requesting client devices. For example, the user interface module(s) 12 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 2, the data layer includes several databases, including databases 18 for storing data for various entities of the social graph, including member profiles 18. Although not shown, consistent with some embodiments, the system may include additional databases for storing other entities, such as company profiles, educational institution profiles, information concerning various online or offline groups, as well as job listings. In addition, the social graph data structure is implemented with a graph database 20, which is a particular type of database that uses graph structures with nodes, edges, and properties to represent and store data. Of course, with various alternative embodiments, any number of other entities might be included in the social graph, and as such, various other databases may be used to store data corresponding with other entities.

Consistent with some embodiments, when a person initially registers to become a member of the social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database with reference number 18.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph. With some embodiments, various other types of relationships may exist between different entities represented in the social graph data 20.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in database (not shown). When a member joins a group, his or her membership in the group will be reflected in the social graph data stored in the database (not shown). With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 20.

The application logic layer includes various application server modules 14, which, in conjunction with the user interface module(s) 12, generates various user interfaces (e.g., web pages) with data retrieved from various data sources in the data layer. With some embodiments, individual application server modules 14 are used to implement the functionality associated with various applications, services and features of the social network service. For instance, a messaging application, such as an email application, an instant messaging application, or some hybrid or variation of the two, may be implemented with one or more application server modules 14. Of course, other applications or services may be separately embodied in their own application server modules 14.

In addition to the various application server modules 14, the application logic layer includes the search engine module 16. As illustrated in FIG. 2, with some embodiments the search engine module 16 is implemented as a service that operates in conjunction with various application server modules 14. For instance, any number of individual application server modules 14 can invoke the functionality of the search engine module 14. However, with various alternative embodiments, the search engine module 16 may be implemented as its own application server module such that it operates as a stand-alone application. With some embodiments, the search engine module 16 may include or have an associated publicly available application programming interface (API) that enables third-party applications to invoke the functionality of the search engine module. With some embodiments, the search engine module 16 may be a people-search engine, and provide functionality to search for people only. Alternatively, the search engine module 16 may facilitate searching of any type of information entity that is maintained and used by the various applications of the social network system, such as companies, groups, job listings, etc.

As illustrated in FIG. 2, the social network system 10 includes social graph data 22, stored in memory. For instance, with some embodiments, a portion of the total social graph data 20 may be resident in memory to provide fast access to certain information, such as information concerning the first and second-degree connections between members of the social network service. In addition, a real-time distance estimator 24 is shown. The distance estimator 24 provides various functionality for estimating the distance between members of the social network service, for example, by deriving a probability score that indicates the probability or likelihood that two members are third-degree connections.

Figure 3:
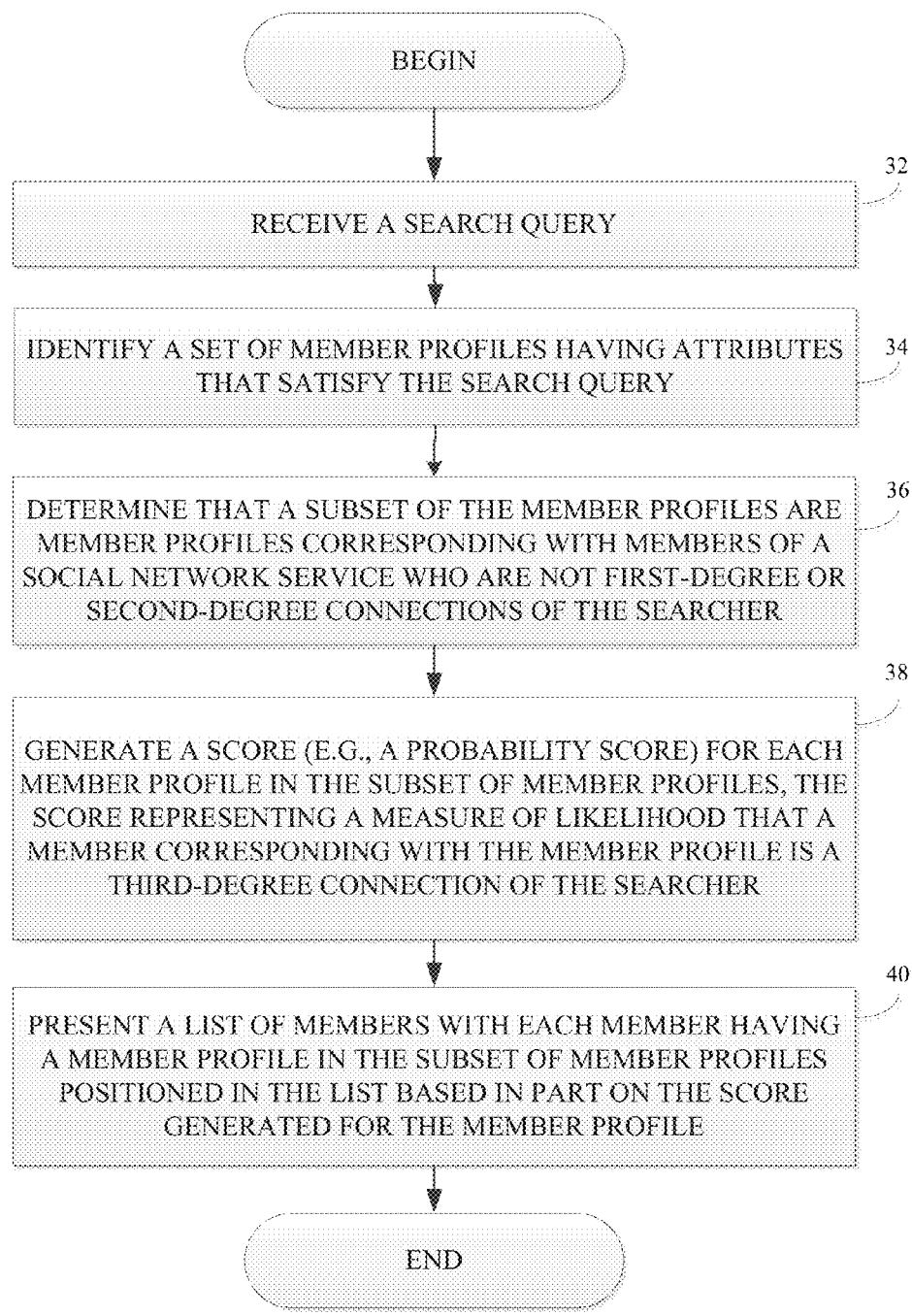
FIG. 3 is a flow diagram illustrating the method operations that occur when estimating the likelihood that a first member is a third degree connection of another member during a person search invoked by a searcher, consistent with some embodiments of the invention.

FIG. 3 is a flow diagram illustrating the method operations that occur when estimating the likelihood that a first member is a third-degree connection of another member during a person search invoked by a searcher, consistent with some embodiments of the invention. At method operation 32, a search engine receives a search query. The search query may, for example, specify a name (e.g., first and/or last), one or more member profile attributes, or any other unstructured search terms. At method operation 34, the search query is processed to identify a set of member profiles that satisfy the search query.

Next, at method operation 36, a subset of the member profiles are determined to correspond with members who are not first-degree or second-degree connections of the searcher. For example, with some embodiments, an identifier for each member profile is used to identify, using the social graph data stored in memory (e.g., social graph data 22 in FIG. 2), the member profiles that correspond with members who are first and second-degree connections of the searcher.

At method operation 38, for each member profile that is not associated with a member who is a first or second-degree connection of the searcher, a score is generated and assigned to the member profile. The score represents a measure of likelihood (e.g., a probability score in some instances) that the member is a third-degree connection of the searcher. Finally, at method operation 40, a list of members is presented to the searcher. The list of members is ordered based on a ranking algorithm that takes into consideration various ranking factors, including whether a member is a first-degree connection, a second-degree connection, and the likelihood that a member is a third-degree connection, as indicated by the score generated at method operation 38. Accordingly, the member profiles corresponding with members who are not first or second-degree connections are presented in the list ordered, based in part, on the scores generated to represent the likelihood that a member is a third-degree connection.

With some embodiments, the order in which the method operations occur may differ from that illustrated in FIG. 3. In particular, with some embodiments, certain operations may occur in parallel, or in an alternative order, different from what is shown in FIG. 3. For example, with some embodiments, when a searcher performs a search, the first and second degree connections of the searcher are retrieved in parallel with the processing of the search query, such that, as the member profiles that satisfy the query are identified, a determination can be made as to whether the members, corresponding with the member profiles, are first or second degree connections of the searcher.

Although the examples presented herein describe the use of specific member profile attributes in estimating the distance between two members. Other member profile attributes not specifically described herein may be used. In particular, information in a member's profile indicating their current company of employment could be compared against the company of employment of the searcher, such that, where there is a match, the score assigned to the member is increased to reflect the greater likelihood that the two members are third-degree connections. Members may specify various skills in their member profiles. These skills may be analysed and compared to estimate the likelihood that two members are third-degree connections. Other member profile attributes might also be used.

Figure 4:
FIG. 4 is a user interface diagram illustrating an example of how search results presented by a people-search engine may be ordered based in part on the likelihood that a member of a social network service is a third-degree connection of the user who is performing the search, consistent with some embodiments of the invention.

FIG. 4 is a user interface diagram illustrating an example of how search results presented by a people-search engine may be ordered based in part on the likelihood that a member of a social network service is a third-degree connection of the user who is performing the search, consistent with some embodiments of the invention. As illustrated in FIG. 4, the list of members presented based on the search query includes two first-degree connections, a single second-degree connection, and two third-degree connections. In this example, the first three search results (e.g., with reference numbers 50, 52 and 54) are shown at the top of the list, reflecting the greater relevance as first and second-degree connections. The search results with reference numbers 56 and 58 have been assigned ranking scores that caused them to be presented ahead of the search result with reference number 60, in part based on the probability score assigned to each of the member profiles corresponding with the search results 56 and 58.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
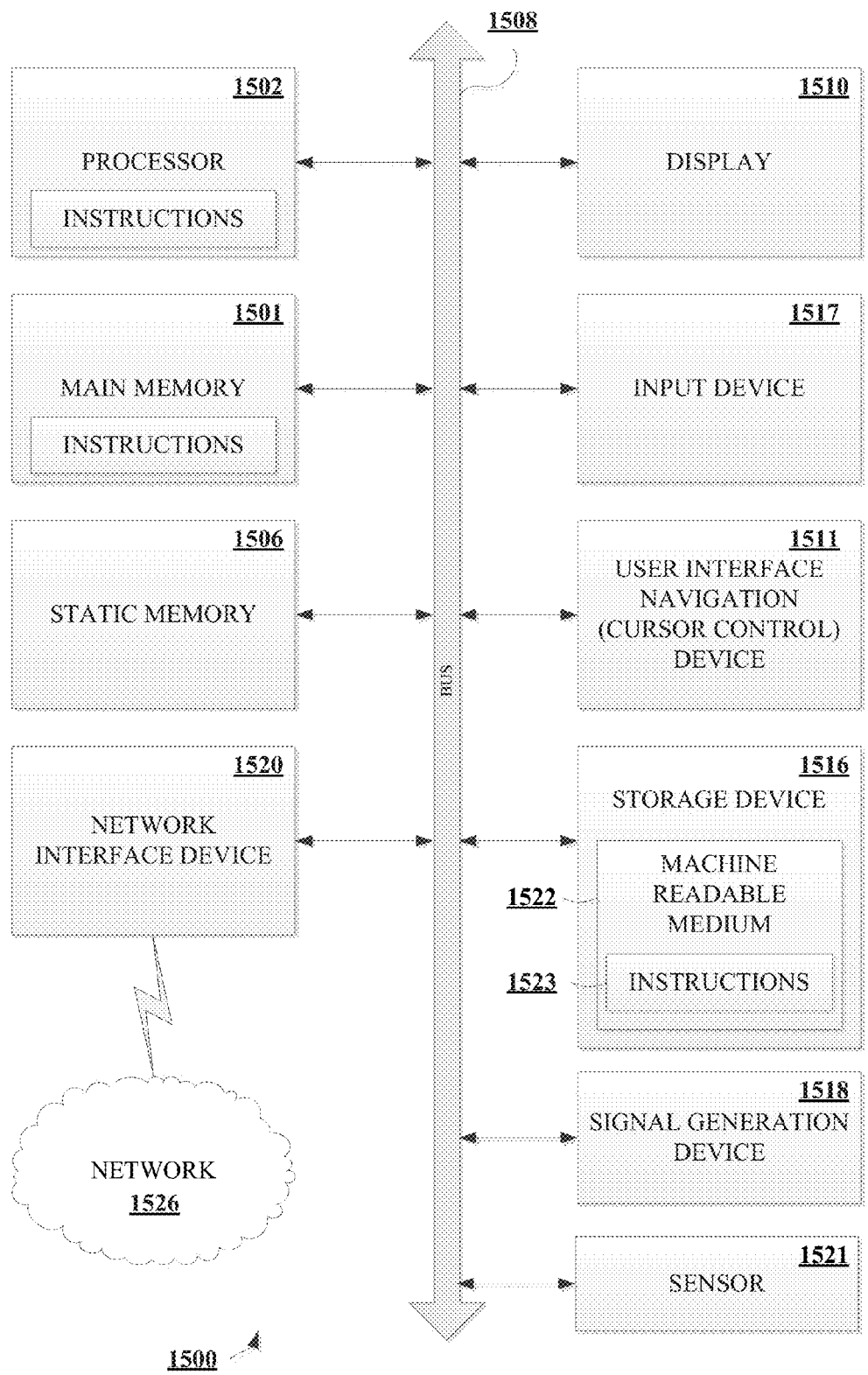
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method to process a search query invoked by a searcher, the method comprising:
   identifying a set of member profiles having attributes that satisfy the search query;
   determining that a subset of the member profiles having attributes that satisfy the search query are member profiles corresponding with members of a social network service who are not first-degree or second-degree connections of the searcher;
   generating a probability score for each member profile in the subset of member profiles, the probability score representing a measure of likelihood that a member corresponding with the member profile is a third-degree connection of the searcher; and
   presenting a list of members with each member having a member profile in the subset of member profiles positioned in the list based in part on the probability score generated for the member profile.

2. The method of claim 1, wherein determining that the subset of the member profiles are member profiles corresponding with member profiles of a social network service who are not first-degree or second-degree connections of the searcher includes identifying, by querying a database stored in memory, the member profiles in the set that correspond with members of the social network service who are first-degree or second-degree connections.

3. The method of claim 2, wherein the member profiles in the set that correspond with members of the social network service who are first-degree or second-degree connections are assigned a score to reflect the distance between the member and the searcher and to influence the position of the member in the search results.

4. The method of claim 1, wherein generating the probability score for each member profile in the subset includes deriving the probability score based on the count of first-degree connections of the member.

5. The method of claim 1, wherein generating the probability score for each member profile in the subset includes deriving the probability score based on a comparison of a geographical location of the member and a geographical location of the searcher, as provided in each respective member profile.

6. The method of claim 1, wherein generating the probability score for each member profile in the subset includes deriving the probability score based on a comparison of an industry in which the member is employed, and an industry in which the searcher is employed, as provided in each respective member profile.

7. The method of claim 1, wherein generating the probability score for each member profile in the subset includes deriving the probability score based on a count of online groups of which the member and the searcher share membership in common.

8. The method of claim 1, wherein generating the probability score for each member profile in the subset includes deriving the probability score based on a determination of whether the member and the searcher have an email address with an email domain shared in common.

9. The method of claim 1, wherein generating the probability score for each member profile in the subset includes deriving the probability score based on a comparison of the date on which the member joined the social network service and the date on which the searcher joined the social network service.

10. The method of claim 1, wherein generating the probability score for each member profile in the subset includes deriving the probability score based in part on a weighted combination of any one or more of:
   the count of first-degree connections of the member;
   a comparison of a geographical location of the member and a geographical location of the searcher, as provided in each respective member profile;
   a comparison of an industry in which the member is employed, and an industry in which the searcher is employed, as provided in each respective member profile;
   a count of online groups of which the member and the searcher share membership in common
   a determination of whether the member and the searcher have an email address with an email domain shared in common;
   a comparison of the date on which the member joined the social network service and the date on which the searcher joined the social network service; and
   a comparison of the date on which the member joined the social network service and the date on which the searcher joined the social network service.

11. A computer-readable storage medium storing instructions thereon, which, when executed by one or more computers, will cause the one or more computers to perform a method comprising:
   identifying a set of member profiles having attributes that satisfy the search query;
   determining that a subset of the member profiles satisfying the search query are member profiles corresponding with members of a social network service who are not first-degree or second-degree connections of the searcher;
   generating a probability score for each member profile in the subset of member profiles, the probability score representing a measure of likelihood that a member corresponding with the member profile is a third-degree connection of the searcher; and
   presenting a list of members with each member having a member profile in the subset of member profiles positioned in the list based in part on the probability score generated for the member profile.

12. The computer-readable storage medium of claim 11, wherein determining that the subset of the member profiles are member profiles corresponding with member profiles of a social network service who are not first-degree or second-degree connections of the searcher includes identifying, by querying a database stored in memory, the member profiles in the set that correspond with members of the social network service who are first-degree or second-degree connections.

13. The computer-readable storage medium of claim 11, wherein the member profiles in the set that correspond with members of the social network service who are first-degree or second-degree connections are ranked to appear in the list of members at positions of greater prominence in the list than the positions at which the members corresponding with member profiles in the subset.

14. The computer-readable storage medium of claim 11, wherein generating the probability score for each member profile in the first subset includes deriving the probability score based on the count of first-degree connections of the member.

15. The computer-readable storage medium of claim 11, wherein generating the probability score for each member profile in the subset includes deriving the probability score based on a comparison of a geographical location of the member and a geographical location of the searcher, as provided in each respective member profile.

16. The computer-readable storage medium of claim 11, wherein generating the probability score for each member profile in the subset includes deriving the probability score based on a comparison of an industry in which the member is employed, and an industry in which the searcher is employed, as provided in each respective member profile.

17. The computer-readable storage medium of claim 11, wherein generating the probability score for each member profile in the subset includes deriving the probability score based on a count of online groups of which the member and the searcher share membership in common.

18. The computer-readable storage medium of claim 11, wherein generating the probability score for each member profile in the subset includes deriving the probability score based on a determination of whether the member and the searcher have an email address with an email domain shared in common.

19. The computer-readable storage medium of claim 11, wherein generating the probability score for each member profile in the subset includes deriving the probability score based on a comparison of the date on which the member joined the social network service and the date on which the searcher joined the social network service.

20. The computer-readable storage medium of claim 11, wherein generating the probability score for each member profile in the subset includes deriving the probability score based in part on a weighted combination of any one or more of:
   the count of first-degree connections of the member;
   a comparison of a geographical location of the member and a geographical location of the searcher, as provided in each respective member profile;
   a comparison of an industry in which the member is employed, and an industry in which the searcher is employed, as provided in each respective member profile;
   a count of online groups of which the member and the searcher share membership in common;
   a determination of whether the member and the searcher have an email address with an email domain shared in common; and
   a comparison of the date on which the member joined the social network service and the date on which the searcher joined the social network service.

* * * * *